United States Patent [19]

Dinan et al.

[11] Patent Number: 4,888,812
[45] Date of Patent: Dec. 19, 1989

[54] DOCUMENT IMAGE PROCESSING SYSTEM

[75] Inventors: Raymond F. Dinan, Mint Hill, N.C.;
James F. Dubil, Lake Wylie, S.C.;
Jerald R. Malin, Charlotte, N.C.;
Robert R. Rodite, Matthews, N.C.;
Clair F. Rohe, Charlotte, N.C.; Gene
D. Rohrer, Concord, N.C.

[73] Assignee: International Business Machines Corporation, Armonk, N.Y.

[21] Appl. No.: 134,734

[22] Filed: Dec. 18, 1987

[51] Int. Cl.⁴ .......................... G06K 9/00; G06K 7/14
[52] U.S. Cl. ............................................ 382/7; 382/57;
235/379; 364/200
[58] Field of Search ...................... 382/7, 57; 235/379;
364/200 MS File

[56] References Cited

U.S. PATENT DOCUMENTS

| | | | |
|---|---|---|---|
| 3,832,682 | 8/1974 | Brok et al. | 340/146.3 |
| 4,096,472 | 6/1978 | Mercier | 382/57 |
| 4,205,780 | 6/1980 | Burns et al. | 235/454 |
| 4,369,430 | 1/1983 | Sternberg | 340/146.3 |
| 4,538,182 | 8/1985 | Saito et al. | 358/280 |
| 4,538,183 | 8/1985 | Kanno et al. | 358/280 |
| 4,538,184 | 8/1985 | Otsuka et al. | 358/283 |
| 4,551,768 | 11/1985 | Tsuchiya et al. | 358/283 |
| 4,553,261 | 11/1985 | Froessl | 382/57 |
| 4,574,351 | 3/1986 | Dang et al. | 364/200 |
| 4,590,606 | 5/1986 | Rohrer | 382/54 |

Primary Examiner—David K. Moore
Assistant Examiner—Yon Jung
Attorney, Agent, or Firm—Bell, Seltzer, Park & Gibson

[57] ABSTRACT

Documents, such as bank checks, are processed at a high rate of speed on an image processing system which optically scans the documents and converts optically perceptible data on the documents into video image data. The video image data from the scanner is compressed by data compression techniques and the compressed data is sent over a high speed data channel to a high speed mass storage device which receives and temporarily stores the data. A lower speed mass data storage device, such as an optical disk, is connected for receiving at a lower data transfer rate the compressed video image data and for storing the video image data for subsequent retrieval. The system also includes real-time quality control systems for monitoring the quality of the image data to detect the existence of unacceptable image quality data and for generating a signal which can be used for immediately stopping the generation of unacceptable quality image data.

34 Claims, 2 Drawing Sheets

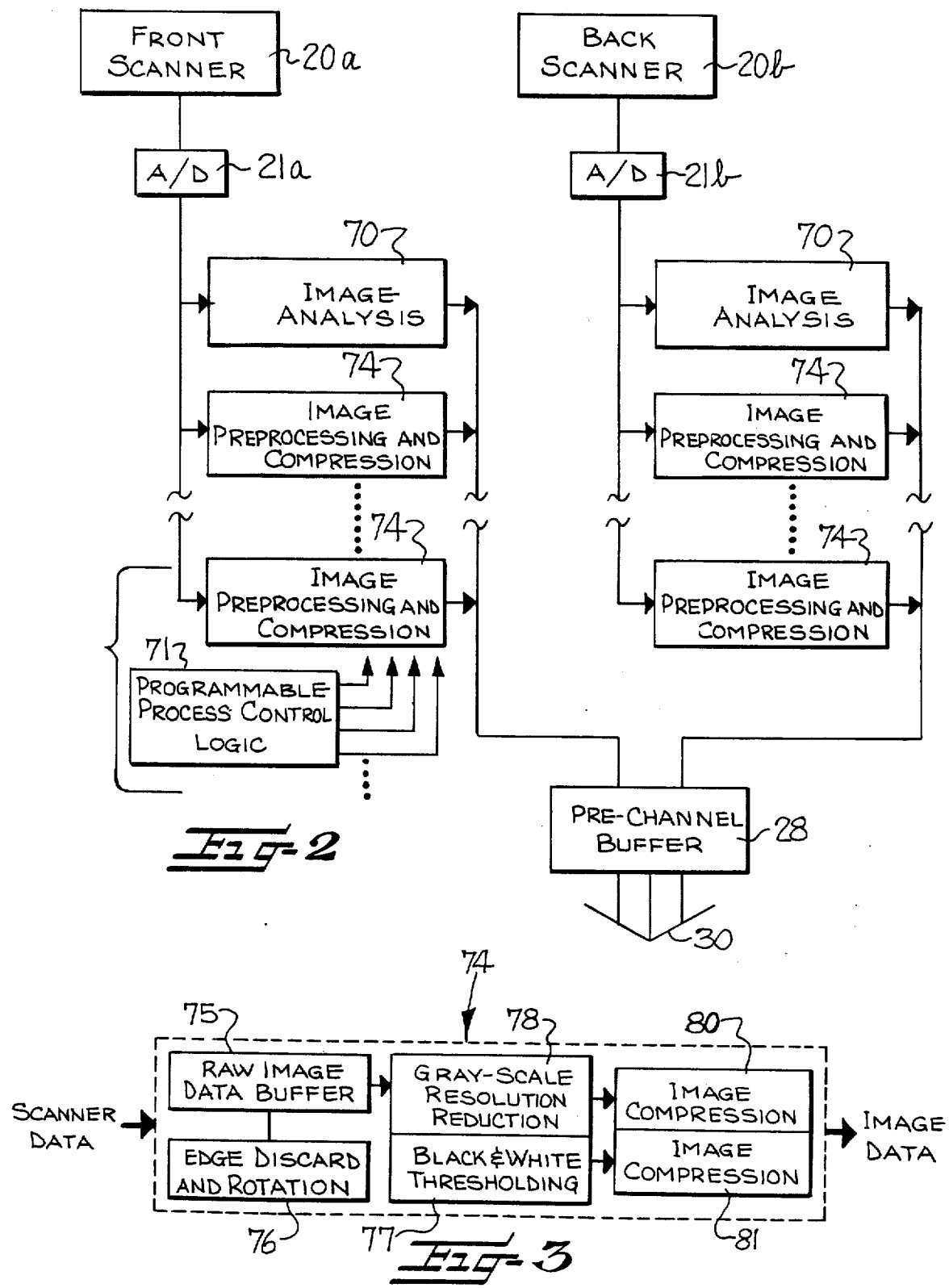

DOCUMENT IMAGE PROCESSING SYSTEM

FIELD AND BACKGROUND OF THE INVENTION

This invention relates to the high speed processing of documents, such as bank checks, and more particularly to a system and method for the high speed capturing, processing and storage of video image data from documents.

Documents such as bank checks are conventionally processed on a high speed reader/sorter which operates at a relatively high rate of speed on the order of about 2400 documents per minute. As the documents are processed through the reader/sorter, they are directed past an MICR reader which reads the magnetic ink characters on the documents The documents may also be directed past a microfilming station which microfilms both the front and back of the document The document is subsequently sorted into one of a number of output bins. In order to be sure that a legible image of the documents was captured on microfilm, it is necessary to hold the documents until the microfilm has been removed from the machine and developed, which could take as long as several days. However, in the case of bank checks, the financial institutions desire to process and forward the checks as quickly as possible to reduce the "float time". Consequently, the institutions are faced with releasing and forwarding the documents before they have obtained confirmation that the microfilming was successful, or holding the documents until the microfilm has been developed and incurring the added cost associated with this delay.

In order to overcome this problem, it has been proposed that the images on the documents be captured electronically rather than on microfilm, using video imaging technology. However, until now this approach has been technologically infeasible, due to the high volume of documents which must be processed and the large amount of video image data which is required to reproduce the images on the documents. Indeed, a recent study conducted by the Federal Reserve Bank concluded that the high speed capture and storage of video image data from bank checks is infeasible with existing video processing technology.

To obtain a high quality image, it is desirable to use a relatively high resolution, of for example, 240 pels per inch. In order to acceptably reproduce high contrast information such as numbers and signatures, as well as lower contrast information such as stamps and endorsements, the image needs to be captured at a high resolution in a number of levels of gray. To capture gray scale data for each side of a bank check at 240 pels per inch resolution and 256 gray levels would require 1.48 megabytes of video image data. Thus, to support the processing of checks at a feed rate of 40 documents per second would require the handling of approximately 118 megabytes of video image data per second.

It will thus be readily appreciated that the high speed processing of video image data from checks generates extremely high volumes of video image data. To be able to handle data at this high volume for a sustained period of time presents very significant technological challenges. Furthermore, since a document processing system employing this technology would need to provide storage for the check images over extended periods of time ranging from days to months or even years, significant challenges are also presented in providing a feasible way to store and retrieve massive amounts of video image data. While the image data could theoretically be stored on high speed mass data storage devices, such as magnetic DASD (Direct Access Storage Devices), the cost of this type of storage becomes prohibitive when considering the volume requirements for several months or even days worth of check image data. While optical storage devices are available which provide a lower cost alternative to mass data storage, the data transfer rates for the presently available optical data storage devices are considerably slower than the data transfer rate of magnetic DASD and would be incapable of accepting the video image data at the rate at which it is being generated, even if sophisticated and powerful data compression techniques are employed.

With the foregoing in mind it is an important object of the present invention to provide a system and method which enables the high speed capture, processing and storage of video image data from documents, such as bank checks.

A further object of the invention is to provide a system which can provide these capabilities at an economically feasible cost.

Because of the very high rate of data capture and storage, it is important to provide an assurance that the video image data which is being captured from the documents is of a quality sufficient for reproducing an acceptable quality image of the document. In particular, it would be desirable to have the capability to monitor image quality on a real time basis so that corrective actions can be taken immediately if the images captured from the documents are of unacceptable quality. Thus, still another object of the invention is to provide a system and method of the type described which provides for real time monitoring of image quality so that appropriate corrective action can be taken immediately if the image quality from the documents becomes unacceptable

SUMMARY OF THE INVENTION

These and other objects, features, and advantages of the present invention are achieved by a unique image processing system architecture and related method, as hereinafter more fully described.

In one of its aspects, the image processing system of the present invention includes a document transport for transporting a series of successive documents along a predetermined path, and a document scanner cooperating with the transport for optically scanning the successive documents and for converting optically perceptible images on the documents into video image data. The video image data from the scanner is compressed by data compression techniques, and the compressed data is sent over a high speed data channel to a high speed mass data storage device which receives and temporarily stores the compressed video image data. The high speed mass data storage device may, for example, comprise a direct access magnetic storage device. A relatively lower speed mass data storage device, such as an optical disk, is connected for receiving at a lower data transfer rate the compressed video image data from the high speed data storage device and for storing the video image data for subsequent retrieval. In a preferred embodiment, the document transport comprises a high speed document reader/sorter which is capable of transporting documents therethrough at a relatively high rate in excess of 1,000 documents per minute.

The system preferably also includes a pre-channel data buffer connected between the data compression device and the high speed data channel for receiving and buffering the flow of data to the high speed data channel. The buffer serves to avoid loss of data in the event that the rate of data transfer from the data compression device temporarily exceeds the data transfer rate of the high speed data channel. Additionally, the system also desirably includes a post-channel data buffer connected between the high speed data channel and the high speed mass data storage device. The post-channel data buffer serves for receiving and buffering the flow of data to the high speed mass data storage device to avoid loss of data in the event that the rate of data transfer from the high speed data channel temporarily exceeds the rate at which the high speed mass data storage device can accept data.

For scanning bank checks, the document scanner is constructed for optically scanning both the front and the back of each document. The high speed data storage device, as well as the low speed data storage device, store video image data for both the front and the back of each document. The video image data which is captured by the document scanner is directed to an image processor which converts the scanner data into digital high resolution gray scale video image data. To further reduce the volume of image data, the image processor includes resolution reduction means for reducing the digital high resolution gray scale video image data (e.g. 240 pels per inch) into digital low resolution gray scale video image data (e.g. 80 pels per inch), as well as a thresholding device for converting the digital high resolution gray scale video image data into digital high resolution black and white video image data. The low resolution gray scale video image data and the high resolution black and white video image data are then each compressed by data compression techniques for storage.

The present invention also provides the capability of monitoring the quality of the images which are captured from the documents in real time as the documents are being processed. One real time image quality control technique involves monitoring the degree of compression of the image data by the data compression unit. If the data compresses to a degree which falls outside of a predetermined parameter which is indicative of acceptable image quality, then a malfunction signal is generated. Thus, for example, if the video image data compresses too much, indicating that the video image data is too sparse or non-existent, a malfunction signal would be generated. The malfunction signal can be utilized for immediately stopping the document transport so as to thereby immediately halt the generation of unacceptable quality image data from the documents.

Another real time image quality control technique involves monitoring the characteristics of the video image data and generating a malfunction signal if the video image data characteristics are outside of a predetermined prescribed range of values which is indicative of acceptable image quality. Thus, for example, the system may monitor the distribution of gray scale values of the digital high resolution gray scale video image data. Acceptable quality images would have a gray scale distribution or "histogram" within certain prescribed limits. If the gray scale values fell outside of these limits, this would be indicative of poor image quality and a malfunction signal is generated The malfunction signal may, in turn, be utilized to immediately stop the document transport and to thereby immediately halt the generation of unacceptable quality image data from the documents.

To attain the necessary rate of data throughput, several of the processing steps are performed concurrently (for the processing of document front and back images) and in parallel (for the processing of all document front images or the processing of all document back images). The number of parallel paths required for processing is a function of the transport throughput rate. Thus, a document transport with a high throughput rate would require more parallel processing paths than a document transport with a lower throughput rate. This architecture allows the same basic image scanning system to be installed on document transports of a wide range of processing speeds.

The processing of data through the paths is under programmable logic control. Status of the data processing in each path is provided to the control logic. Based on this status, the control logic decides which path receives the next document image to be processed. Thus, if the image in a particular path has not completed processing, that path can be skipped and the next available path will be used for processing the image. Also, if a hardware malfunction is detected in a particular processing path, that path can be skipped by the control logic until it has been repaired (the throughput of the document transport will be decreased due to the loss of the processing path but use of the system is not lost—the user can still process documents at a slower rate rather than loosing full use of the image processing system).

The system employs a series of parallel processing paths for processing document front images and a second series of parallel processing paths for processing document back images. Thus, for example, the system may employ a plurality of image processing units functioning in parallel for simultaneously processing image data from the front and back of documents.

BRIEF DESCRIPTION OF THE DRAWINGS

Some of the features and advantages of the invention having been stated, others will become apparent from the detailed description which follows and from the accompanying drawings in which FIG. 2 is a schematic system diagram showing in more detail image scanning and compression subsystem, and FIG. 3 is a schematic system diagram of the image processing and compression units.

DESCRIPTION OF ILLUSTRATED EMBODIMENT

Figure 1:
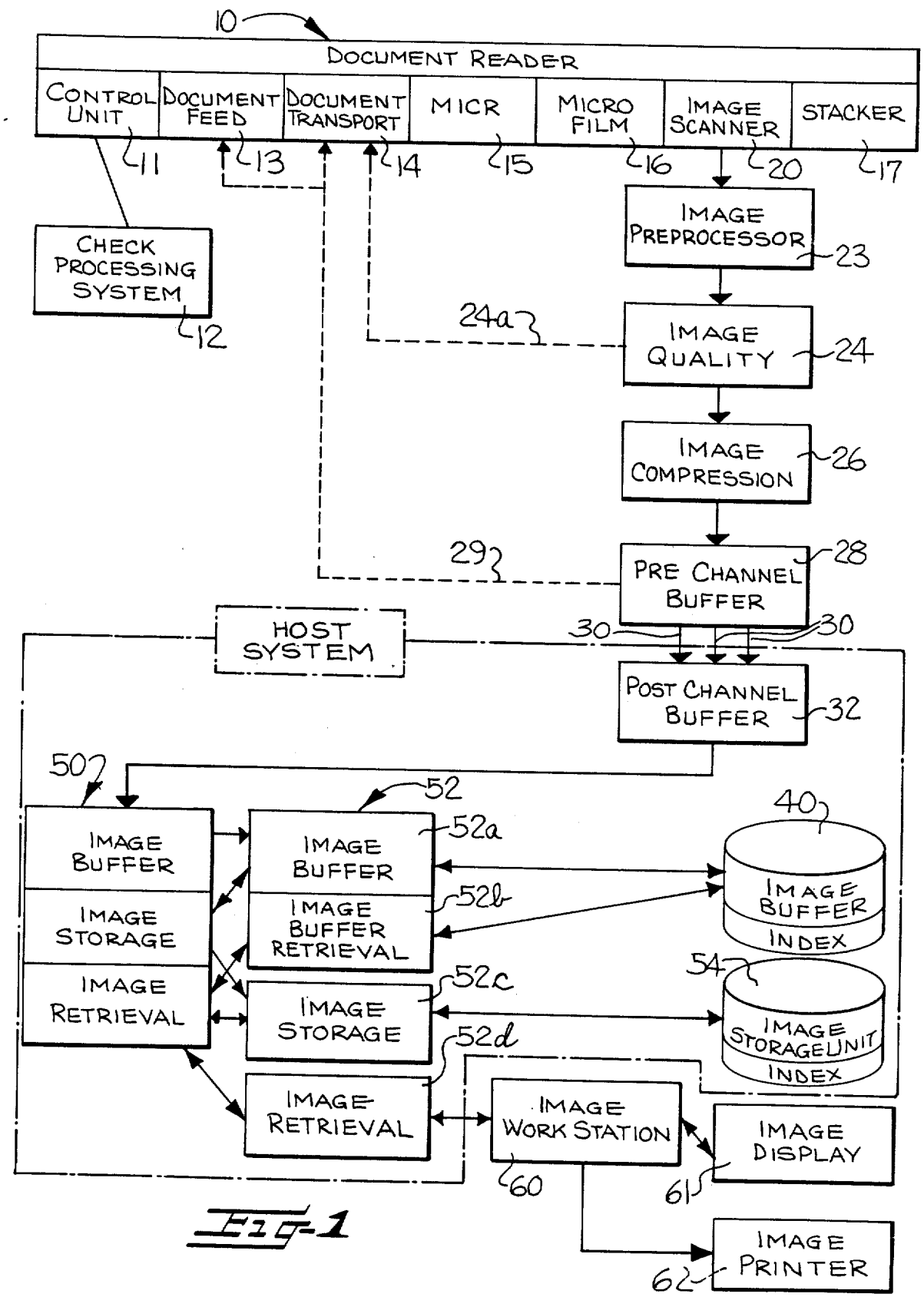
FIG. 1 is a schematic functional diagram of the video image processing system of this invention.

The document image processing system of the present invention may utilize a commercially available high speed document reader/sorter such as the IBM 3890 reader/sorter for handling documents at a high rate of speed on the order of about 2400 documents per minute. A document reader/sorter of this type is indicated schematically in FIG. 1 by the reference character 10, and includes a control unit 11 which may be operatively connected in a known manner to other components 12 of a check processing system. The reader/sorter includes a document feed 13, typically including a hopper for receiving a supply of documents and a feed mechanism for directing the successive documents from the hopper to a document transport 14. As the documents are transported through the reader/sorter by the transport 14, they may be directed past an MICR module 15 which reads information encoded on magnetic ink characters on the documents. The documents may also be directed past an optional microfilm module 16 where images of the front and back of each document are captured by microfilm. The documents are ultimately transported to a stacker 17 which may include a series of output bins into which the documents are sorted. All of the foregoing components are conventionally provided in a high speed document reader/sorter. In accordance with the present invention an image scanner 20 is incorporated in the reader/sorter in lieu of or in addition to the microfilm module so that as the documents flow through the reader, the front and back surfaces of the documents are scanned and optically perceptible information contained on the documents is transformed into video image data. The image scanner 20 may, for example, comprise a charge coupled device (CCD) scanner array which generates a sequence of analog values representing light and dark areas defining the image on the document. As shown in FIG. 2, the image scanner 20 includes a front scanner 20a and a back scanner 20b arranged for simultaneously scanning both the front and the back of the documents. The scanner arrays 20a, 20b are connected respectively to analog to digital converters 21a, 21b which convert the analog values into discrete binary gray scale values, of for example, 256 gray scale levels.

As represented in FIG. 1 at 23, the high resolution gray scale image data from the scanner is directed to an image data preprocessor in which the image data may be enhanced and/or smoothed, and which also serves to locate the edges of successive documents and discard irrelevant data between documents. If the documents are slightly skewed, the image preprocessor 23 can perform rotation on the image data to facilitate subsequent processing.

The characteristics of the video image data are monitored for unacceptable image quality as indicated at 24, and if necessary, the document transport operation may be altered or stopped to prevent the capturing of bad image data. For example, the image quality unit 24 may monitor the distribution of gray scale values in the image data and create a "histogram". Experience has shown that acceptable quality images would have a distribution of gray scale values within certain prescribed limits. If the gray scale distribution of the histogram fell outside of these prescribed limits, this would be indicative of poor image quality and a malfunction signal is generated. The malfunction signal may in turn be utilized to stop the document transport, as represented by the control signal line 24a in FIG. 1. Following image quality monitoring, the image data is subjected to image data reduction and compression techniques as indicated at 26 to thereby reduce the image data bandwidth and storage requirements. The compressed image data is thereafter transferred over a high speed data channel 30 for temporary storage on an image buffer 40. The image buffer 40 may comprise a high speed magnetic disk storage unit.

The amount of video image data per document may vary depending upon the size and nature of the document and the efficiency of the data compression and reduction for that particular document. To insure that no data is lost in the event that the volume of image data may temporarily exceed the transfer capacity of the high speed data channel 30, a pre-channel buffer 28 is interposed prior to the data channel 30. The capacity of the pre-channel buffer is continually monitored and as indicated at 29, information regarding the capacity of the pre-channel buffer is routed back to the document feed 13 and document transport 14 so that appropriate action can be taken, if necessary, to avoid overfilling of the pre-channel buffer and loss of video image data. This function is described more fully in commonly owned copending application Ser. No. 134,493 filed concurrently herewith, the disclosure of which is incorporated herein by reference. Reference may be made to this copending application for a more detailed explanation of the pre-channel buffer monitoring and control functions.

Image data from the high speed data channel 30 is read into a post-channel buffer 32. Image data from the post-channel buffer 32 is ultimately received by the central processing unit of a host computer, represented in FIG. 1 by the reference character 50. The input and output data channels associated with the processor 50 are indicated broadly at 52.

The compressed video image data which is received over the high speed data channel 30 is initially routed by an image buffer data channel 52a to the image buffer 40 for temporary storage. The image buffer 40 is preferably of a size capable of storing the image data from at least several batches or runs of checks, and most desirably would be capable of holding and storing several days worth of image data. The post-channel buffer 32 functions to prevent any loss of data in the event that the rate of data transfer over the high speed data channel 30 may temporarily exceed the capacity of the image buffer 40 or image buffer data channel 52 to receive and handle data.

At convenient times, such as during periods of low processing demands, the records from the image buffer 40 are transferred to a slower speed longer term image storage device 54, such as optical disks. As represented in FIG. 1, this transfer of image data is achieved by reading the records from the image buffer 40 over the image buffer data channel 52a to the central processor 50 which, in turn, directs the data via image storage data channel 52c to the image storage unit 54.

The video processing system also employs a number of image workstations for retrieval of the captured video image data. One such image workstation is represented in FIG. 1 at 60 and includes an image display device 61 such as a CRT screen, as well as an image printer 62. Records from either the image buffer 40 or from the image storage unit 54 can be retrieved by an image workstation 60 via an image retrieval data channel 52d. To facilitate retrieval of the images, the image buffer 40 and the image storage unit 54 may include suitable indexes. Thus, for example, the images may be indexed by the sequence number assigned to the documents at the time of scanning.

To accommodate the high sustained volumes of data generated in the document processing system, the architecture of this system employs multiple identical parallel paths for the image data flow. Thus, as best seen in FIG. 2, image data from the front scanner 20a and from the back scanner 20b flow along parallel data paths for simultaneous processing. An image analysis unit 70 associated with each data path samples the digitized video data as it is transferred into each image preprocessing and compression unit 74. By comparing each pel's value to a predetermined threshold value, the pels associated with the document image can be distinguished from those of the unneeded video region surrounding and between the documents. The boundary locations for the document edges are determined, and the locations of these boundaries are passed to the image preprocessing and compression units. The image analysis unit also monitors the characteristics of the video image by generating a histogram of the pel values in the image. The histogram is then compared to the histograms of known modes of failure, such as those for an image too dark, an image too light, and faulty scanner output. The results of this comparison can be used to generate a malfunction signal to an operator so the appropriate repair action can be taken.

As seen in FIG. 2, the data from the front and back scanners is handled in a substantially identical fashion. For each data path there is provided a series of image processing and compression units 74. The programmable process control logic 71 determines which unit 74 is to be loaded with a document image and monitors the processing of image data through all image processing and compression units. If a particular unit 74 is busy or not functional, that unit can be skipped and the next available unit will be loaded with the document image. The number of image processing and compression units required for attaining the necessary image processing throughput rate is determined by the document transport throughput rate—the higher the document transport throughput rate, the more image processing and compression units required. The processed and compressed image data from the respective image processing and compression units is then directed to the pre-channel buffer 28 and thereafter to the high speed data channel 30.

FIG. 3 shows the operation of the image processing and compression units in greater detail. Each such unit 74 includes a raw image data buffer 75 into which the image data is initially written. An edge discard and rotation module 76 is associated with the raw image data buffer. The document location parameters determined by the image analysis unit 70 are transferred to the edge discard and rotation module 76. The parameters are used for generating the address of each pel on the document as stored in the raw image data buffer 75. The edges of the image around the document are discarded by not addressing these pels, such that only pels determined to be part of the document's image are addressed. Each addressed pel is transferred out of the raw image data buffer 75 for black and white thresholding 77 and gray scale resolution reduction 78. As the pels are accessed, they are addressed in a manner which follows along the edges of the image in memory. This has the effect of rotating the image so that when the image is later displayed, it will appear squarely on the desired display screen or print-out.

At this point, a further reduction in the volume of image data is achieved by creating two separate versions of the image data for storage, a full resolution black and white image and a lower resolution gray scale image. This approach yields significant data reduction and maintains both good high contrast definition for sharp lines and strokes, and good quality soft edged faint definition for endorsement stamps, background signatures and the like. These two separate images can be later combined with a suitable mixing algorithm to produce a reconstructed high resolution gray scale video image data. One suitable method for recombining the separate forms of image is described in commonly owned copending application Ser. No. 134,733, the disclosure of which is incorporated herein by reference.

Again referring to FIG. 3, the high resolution gray scale image data is converted to black and white binary image data at the capture resolution by a black and white thresholding unit 77. This enables the data for each picture element (pel) to be stored in a bit instead of a byte required for the 256 level gray scale representation. The black and white thresholding is done using dynamic or adaptive thresholding that tracks and corrects for background shading and determines if a pel should be black or white. This adaptive thresholding provides a comparison of a pels gray-scale value with those of its neighbors and adopts a Laplacian edge enhancement approach. A nonlinear adaptive rate factor will also be used to provide additional noise rejection.

Determination of the binary output decision is based on whether the pel under consideration is significantly blacker than its surroundings. The surrounding area to be considered will be at least as large as a printed or stamped character that is being discriminated against its background. A single pass, running average approach to generate the background value is preferred. If the contrast ratio of the character to the background is high, then the threshold level will be increased by an additional amount to reduce "noise" from dirt, smudges, background printing, etc. The average must adapt quickly after leaving a very dark character so that a following lighter character will not be eliminated. Use of a nonlinear update ratio (or weighting value for the average) allows the average to adjust rapidly to large high contrast signals and to have a tendency to follow the blacker peaks of the stroke pels.

The high resolution gray scale image data from the raw image data buffer 75 is also directed to a gray scale resolution reduction unit 78. A lower resolution gray scale image will be generated by the resolution reduction unit by averaging contiguous groups of higher resolution pels. For example, the resolution may be reduced by one third from 240 pels per inch to 80 pels per inch. In this instance, each low resolution pel covers a 3×3 pel area and hence its gray scale value is computed by averaging the gray scale values of the 9 corresponding high resolution pels.

The originally captured gray scale values were represented by one byte values able to represent 256 distinct gray levels. The data volume may be further reduced by using only half a byte per pel (4 bits) rather than a full byte, allowing the storage of 16 distinct levels of gray scale values. These distinct values will be uniformly spread over the 0–255 originally gray scale values.

The reduced resolution gray scale image data and the thresholded black and white image data are each directed to respective image compression units 80, 81. Suitable data compression units have been developed which are capable of relatively rapid rates of data compression on the order of about 5 megabytes per second employing known compression techniques such as one dimensional, modified Huffman coding, two dimensional, modified read coding with programmable K-parameter, and adaptive arithmetic coding. The thus compressed low resolution gray scale image data and high resolution black and white image data are directed to the pre-channel buffer 28 along data channel 30 for subsequent separate storage and retrieval.

We claim:

1. A system for high speed capture, processing and storage of video image data from documents, such as bank checks, comprising document transport means for transporting a series of successive documents along a predetermined path of travel, document scanner means cooperating with said transport means for optically scanning the successive documents and for converting optically perceptible images thereon into video image data, image processor means cooperating with said document scanner means for receiving video image data and for converting the data into low resolution digital gray scale video image data representing the optically perceptible images on the documents as well as into higher resolution black and white video image data representing the optically perceptible images, data compression means associated with said image processor means for receiving and compressing the video image data obtained from the documents, a high speed data channel for receiving the compressed video image data from said compression means at a relatively high data transfer rate, a high speed mass data storage device connected to said high speed data channel for receiving and temporarily storing the compressed video image data, and a relatively lower speed mass data storage device for receiving the compressed video image data from said high speed data storage device and for storing the compressed video image data for subsequent retrieval.

2. The system according to claim 1 wherein said relatively lower speed mass data storage device comprises optical disk means.

3. The system according to claim 1 wherein said high speed mass data storage comprises a direct access magnetic storage device.

4. The system according to claim 1 including pre-channel data buffer means connected between said data compression means and said high speed data channel for receiving and buffering the flow of data to said high speed data channel to avoid loss of data in the event the rate of data transfer from said data compression means temporarily exceeds the data transfer rate of said high speed data channel.

5. The system according to claim 1 or 4 including post-channel data buffer means connected between said high speed data channel and said high speed mass data storage device for receiving and buffering the flow of data to said high speed mass data storage device to avoid loss of data in the event the rate of data transfer from said data channel temporarily exceeds the rate at which said high speed mass data storage device can accept data.

6. The system according to claim 1 wherein said document scanner means includes means for optically scanning both the front and the back of each of a series of successive documents, and wherein said high speed data storage device and said low speed data storage device include means for storing video image data for both the front and the back of each of said documents.

7. The system according to claim 1 including real-time image quality control means cooperating with said image processor means for monitoring the characteristics of the video image data and for generating a signal if the video image data characteristics are outside of a predetermined prescribed range of values which is indicative of acceptable image quality.

8. The system according to claim 7 wherein said real time image quality control means includes means for monitoring the distribution of gray scale values of the digital gray scale video image data and for generating said signal if the distribution of gray scale values is outside of a predetermined acceptable distribution.

9. The system according to claim 7 or 8 including means responsive to said signal for immediately stopping said document transport means to thereby immediately halt the generation of unacceptable quality image data from the documents.

10. A system for high speed capture, processing and storage of video image data from documents, such as bank checks, comprising document transport means for transporting a series of successive documents along a predetermined path of travel, document scanner means cooperating with said transport means for optically scanning the successive documents and for converting optically perceptible images thereon into video image data, data compression means associated with said scanner means for receiving and compressing the video image data obtained from the documents, real-time image quality control means cooperating with said data compression means for monitoring the degree of compression of said image data by said data compressions means and for generating a signal in the event that the degree of data compression falls outside of predetermined parameter which is indicative of acceptable image quality, a high speed data channel for receiving the compressed video image data from said compression means at a relatively high data transfer rate, a high speed mass data storage device connected to said high speed data channel for receiving and temporarily storing the compressed video image data, and a relatively lower speed mass data storage device for receiving the compressed video image data from said high speed data storage device and for storing the compressed video image data for subsequent retrieval.

11. The system according to claim 10 including means responsive to said signal for immediately stopping said transport means to thereby immediately halt the generation of unacceptable quality image data from the documents.

12. The system according to claim 1 including image works means connected to said lower speed mass data storage device for accessing and retrieving video image data for a selected document stored on said mass data storage device and for creating therefrom a visually perceptible representation of the stored image.

13. The system according to claim 12 wherein said image workstation means is also connected to said high speed mass data storage means for accessing and retrieving video image data stored on said high speed mass data storage means.

14. A system for high speed capture, processing and storage of video image data from documents, such as bank checks, comprising document transport means for transporting a series of successive documents along a predetermined path of travel, document scanner means cooperating with said transport means for optically scanning the successive documents and for converting optically perceptible images thereon into video image data, image processor means cooperating with said document scanner means for receiving video image data representing the optically perceptible images on the documents and for converting the video image data into digital gray scale video image data, data compression means associated with said image processor means for receiving and compressing the digital gray scale video image data, and wherein said real-time image quality control means includes means cooperating with said data compression means for monitoring the degree of compression of said image data by said data compressions means and for generating a signal in the event that the degree of data compression falls outside of predetermined parameter which is indicative of acceptable image quality, a mass data storage device connected to said image processor means for receiving and storing the digital video image data, and real-time quality control means cooperating with said image processor means for monitoring the characteristics of the video image data and for generating a signal if the video image data characteristics are outside of a prescribed range of values which is indicative of acceptable image quality.

15. The system according to claim 14 wherein said real time image quality control means includes means for monitoring the distribution of gray scale values of the digital gray scale video image data and for generating said signal if the distribution of gray scale values is outside of a predetermined acceptable distribution.

16. The system according to claim 14 or 15 including means responsive to said signal for immediately stopping said document transport means to thereby immediately halt the generation of unacceptable quality image data from the documents.

17. The system according to claim 14 including means responsive to said signal for immediately stopping said transport means to thereby immediately halt the generation of unacceptable quality image data from the documents.

18. A system for high speed capture, processing and storage of video image data from documents, such as bank checks, comprising, document transport means for transporting a series of successive documents along a predetermined path of travel, document scanner means cooperating with said transport means for optically scanning the successive documents and for converting optically perceptible images thereon into video image data, image processor means cooperating with said scanner means for receiving video image data representing the optically perceptible images on the documents, said image processor means including means for converting the video image data from said scanner means into digital gray scale video image data of a predetermined first resolution, resolution reduction means for reducing the gray scale video image data to digital gray scale video image data of a second resolution lower than said first resolution, and thresholding means for converting the digital gray scale video image data of said first resolution to black and white video image data of said first resolution, image data compression means for receiving and compressing the video image data from said image processor means, said image data compression means including means for receiving and compressing the lower resolution gray scale video image data from said image processor means, and means for receiving and compressing the higher resolution black and white video image data from said image processor means, a high speed data channel for receiving the compressed lower resolution gray scale video image data and the compressed higher resolution black and white video image data from said compression means at a relatively high data transfer rate, and a high speed mass data storage device connected to said high speed data channel for receiving and storing both the compressed lower resolution gray scale video image data and the compressed higher resolution black and white video image data.

19. The system according to claim 18 wherein said image processor means includes a plurality of image processor units, each including said resolution reduction means and said thresholding means, and means connecting said image processor units for operating in parallel to receive video image data from respective documents and for concurrently producing said lower resolution gray scale image data and said higher resolution black and white image data for the respective documents.

20. The system according to claim 19 including process control logic means cooperating with the respective image processor units for controlling the flow of document images to an available image processor unit while processing of other document images is being carried out in other units.

21. The system according to claim 18 wherein scanner means includes means for optically scanning both the front and the back of each of the successive documents, and wherein said high speed mass data storage device includes means for storing compressed lower resolution gray scale image data and compressed higher resolution black and white image data for both the front and the back of each of said documents.

22. The system according to claim 21 wherein said image processor means and said image data compression means each include means defining parallel data paths for concurrent image processing and compression of the video image data from the front and back of the document.

23. The system according to claim 21 wherein said document transport means includes means for transporting a series of successive groups of documents along a predetermined path of travel, and said document scanner means includes means for successively optically scanning each of the documents in the group, and wherein said image processing means includes respective document buffers for receiving image data from each of the documents in the group.

24. The system according to claim 23 wherein said data compression means includes a plurality of respective data compression units associated respectively with said plurality of document buffers, said compression units being operable in parallel for concurrently compressing the video image data from the respective documents in each group.

25. A system for high speed capture, processing and storage of video image data from documents, such as bank checks, comprising
- a high speed document sorter having a hopper for receiving a supply of documents for processing, a plurality of output bins into which the documents are sorted, and document transport means for transporting the documents therethrough at a rate in excess of a 1000 documents per minute,
- document scanner means associated with said sorter for optically scanning both the front and back of the documents as they are transported through the sorter and for converting optically perceptible images present thereon into separate streams of video image data for the front and back of the documents,
- image processor means cooperating with said scanner means for (a) receiving the separate streams of video image data along parallel data paths and for (b) concurrently processing the separate streams of image data to produce for each stream of image data, (a) relatively low resolution gray scale image data and (b) relatively high resolution black and white image data,
- image data compression means for receiving and compressing the video image data from said image processor means, said image data compression means including means for receiving and compressing the relatively low resolution gray scale video image data from said image processor means, and means for concurrently receiving and processing the relatively high resolution black and white video image data from said image processor means,
- a high speed data channel for receiving the compressed relatively low resolution gray scale video image data and the compressed relatively high resolution black and white video image data for both the front and the back of said documents from said compression means at a relatively high data transfer rate,
- high speed direct access magnetic storage means connected to said high speed data channel for receiving and temporarily storing the compressed video image data,
- optical data storage means having a data transfer rate substantially lower of than that of said high speed data channel, and
- a relatively low speed data channel for transferring the video image data stored temporarily on said high speed direct access magnetic storage means to said optical data storage means for permanent storage.

26. The system according to claim 25 wherein said image processor means comprises means for converting the video image data from said scanner means into digital high resolution gray scale video image data, resolution reduction means for reducing the high resolution gray scale video image data into low resolution gray scale video image data, and thresholding means for converting the high resolution gray scale video image data into high resolution black and white video image data.

27. A method for high speed capture, processing and storage of video image data from documents, such as bank checks, comprising
- transporting a series of successive documents along a predetermined path of travel and optically scanning the documents to obtain video image data representing the optically perceptible images on the documents,
- converting the video image data obtained from the documents into digital gray scale video image data of a predetermined first resolution, reducing the digital gray scale video image data of said first resolution to digital gray scale video image data of a second resolution lower than said first resolution, thresholding the digital gray scale video image data of said first resolution into black and white video image data of said first resolution,
- compressing the video image data obtained from the documents and transmitting the compressed video image data at a relatively high data transfer rate over a high speed data channel to a high speed mass data storage device,
- temporarily storing on the high speed mass data storage device, both the gray scale video image data of said first resolution and the black and white video image data of said first resolution, and
- transferring the compressed video image data from the high speed data storage device at a relatively lower data transfer rate to a lower speed mass data storage device and storing the compressed video image data thereon for subsequent retrieval.

28. The method according to claim 27 wherein the step of optically scanning the successive documents comprises optically scanning both the front and back of each of the successive documents, and wherein said step of storing the video image data includes storing video image data for both the front and the back of each of the documents.

29. The method according to claim 27 including monitoring the characteristics of the video image data and generating a signal if the video image data characteristics are outside of a predetermined prescribed range of values which is indicative of acceptable image quality.

30. The method according to claim 29 wherein said step of monitoring the characteristics of the video image data comprises monitoring the distribution of gray scale values of the digital gray scale video image data and generating said signal if the distribution of gray scale values is outside of a predetermined acceptable distribution.

31. The method according to claim 29 including the step of immediately stopping the transporting and scanning of documents in response to the generating of said signal to thereby immediately halt the generation of unacceptable quality image data from the documents.

32. A method for high speed capture, processing and storage of video image data from documents, such as bank checks comprising
- transporting a series of successive documents along a predetermined path of travel and optically scanning the documents to obtain video image data representing the optically perceptible images on the documents,
- receiving the video image data representing the optically perceptible images on the documents and converting the video image data into digital gray scale video image data,
- compressing the digital gray scale video image data, and
- monitoring the degree of compression of the video image data obtained from the documents and generating a signal if the degree of data compression of the video image data falls outside of a prescribed range of values which is indicative of acceptable image quality.

33. The method according to claim 32 including the additional steps of monitoring the distribution of gray scale values of the digital gray scale video image data and generating a signal if the distribution of gray scale values is outside of a predetermined acceptable distribution.

34. A system for high speed capture, processing and storage of video image data from documents, such as bank checks, comprising document transport means for transporting a series of successive documents along a predetermined path of travel, document scanner means cooperating with said transport means for optically scanning the successive documents and for converting optically perceptible images thereon into video image data, image processor means cooperating with said document scanner means for receiving video image data representing the optically perceptible images on the documents and for converting the video image data into digital gray scale video image data of a predetermined first resolution, said image processor means including resolution reduction means for reducing the digital gray scale video image data of said first resolution to digital gray scale video image data of a second resolution lower than said first resolution, and thresholding means for converting the digital gray scale video image data of said first resolution into digital black and white video image data of said first resolution, data compression means associated with said scanner means for receiving and compressing the video image data obtained from the documents, said image data compression means including means for receiving and compressing both the gray scale video image data of said second resolution and the black and white video image data of said first resolution for storage by said high speed mass data storage device, a high speed data channel for receiving the compressed video image data from said compression means at a relatively high data transfer rate, a high speed mass data storage device connected to said high speed data channel for receiving and temporarily storing the compressed video image data, and a relatively lower speed mass data storage device for receiving the compressed video image data from said high speed data storage device and for storing the compressed video image data for subsequent retrieval.

* * * * *

UNITED STATES PATENT AND TRADEMARK OFFICE
CERTIFICATE OF CORRECTION

PATENT NO. : 4,888,812

DATED : December 19, 1989

INVENTOR(S) : Raymond F. Dinan, et al.

It is certified that error appears in the above-identified patent and that said Letters Patent is hereby corrected as shown below:

Column 10, line 53, "works" should be -- workstation --

Column 12, line 39, after "wherein" insert -- said document --

Signed and Sealed this

Twenty-sixth Day of February, 1991

*Attest:*

HARRY F. MANBECK, JR.

*Attesting Officer*   *Commissioner of Patents and Trademarks*